(12) United States Patent
Malachowsky et al.

(10) Patent No.: US 7,967,208 B2
(45) Date of Patent: Jun. 28, 2011

(54) SYSTEM, METHOD AND COMPUTER PROGRAM PRODUCT FOR MARKING AN ARTICLE OF MANUFACTURE WITH A SUPPLEMENTAL IDENTIFIER

(75) Inventors: Chris Alan Malachowsky, Los Altos Hills, CA (US); Lawrence A. Sladewski, Monte Sereno, CA (US)

(73) Assignee: NVIDIA Corporation, Santa Clara, CA (US)

( * ) Notice: Subject to any disclaimer, the term of this patent is extended or adjusted under 35 U.S.C. 154(b) by 694 days.

(21) Appl. No.: 11/560,245

(22) Filed: Nov. 15, 2006

(65) Prior Publication Data
US 2008/0114482 A1    May 15, 2008

(51) Int. Cl.
G06F 17/00 (2006.01)
G06F 19/00 (2006.01)
G06K 7/00 (2006.01)
G06K 19/00 (2006.01)

(52) U.S. Cl. .................. 235/462.01; 235/375; 235/435; 235/487; 700/117

(58) Field of Classification Search .................. 235/487, 235/375, 435, 462.01–462.49; 700/117
See application file for complete search history.

(56) References Cited

U.S. PATENT DOCUMENTS

| | | | |
|---|---|---|---|
| 6,109,529 A * | 8/2000 | Nelson, Jr. | 235/487 |
| 6,561,425 B2 * | 5/2003 | Kresina et al. | 235/462.01 |
| 6,778,390 B2 | 8/2004 | Michael | |
| 7,182,259 B2 | 2/2007 | Lubow et al. | |
| 7,219,252 B1 * | 5/2007 | Li et al. | 713/501 |
| 2002/0116274 A1 * | 8/2002 | Hind et al. | 705/23 |
| 2006/0015752 A1 * | 1/2006 | Krueger | 713/193 |
| 2006/0033608 A1 * | 2/2006 | Juels et al. | 340/10.1 |
| 2006/0150851 A1 | 7/2006 | Bremond et al. | |
| 2007/0158436 A1 * | 7/2007 | Ichikawa et al. | 235/492 |

FOREIGN PATENT DOCUMENTS

| | | |
|---|---|---|
| AU | 743556 B2 | 9/1998 |
| JP | 1281564 A | 11/1989 |
| JP | 5112347 A | 5/1993 |
| JP | 10049756 A | 2/1998 |
| JP | 2000090228 A | 3/2000 |
| KR | 20040085800 A | 10/2004 |
| TW | I260547 B | 8/2006 |
| WO | 03038738 A1 | 5/2003 |
| WO | 2004088579 A1 | 10/2004 |

OTHER PUBLICATIONS

Japanese Office Action (no translation) from application No. 2007-201050 mailed on Nov. 26, 2009.
Chinese Office Action from application No. 2007101546484 issued on May 8, 2009.

(Continued)

*Primary Examiner* — Daniel A Hess
*Assistant Examiner* — Laura Gudorf
(74) *Attorney, Agent, or Firm* — Zilka-Kotab, PC

(57) ABSTRACT

A system, method and computer program product are provided for marking an article of manufacture. After marking an article of manufacture with a first identifier that describes at least one aspect of the article, such article is further marked with a supplemental identifier that describes the at least one aspect of the article.

22 Claims, 8 Drawing Sheets

OTHER PUBLICATIONS

Chinese Office Action (no translation) from application No. 2007101546484 mailed on Oct. 30, 2009.
Korean Office Action from application No. 10-2007-115988 mailed on Nov. 5, 2009.
Korean Office Action from Korean Application No. 10-2007-115988 e-mailed on Aug. 31, 2009.
Office Action from Tawain Patent Application No. 096129059, dated Oct. 27, 2010.
Final Rejection (Maintained) from Korean Patent Application No. 10-2007-0115988, dated Jan. 27, 2010.

* cited by examiner

SYSTEM, METHOD AND COMPUTER PROGRAM PRODUCT FOR MARKING AN ARTICLE OF MANUFACTURE WITH A SUPPLEMENTAL IDENTIFIER

FIELD OF THE INVENTION

The present invention relates to marking articles of manufacture, and more particularly to updating such markings.

BACKGROUND

Prior art FIG. 1 illustrates a process 100 for marking an article of manufacture, in accordance with the prior art. As shown, the article of manufacture is initially marked with indicia indicative of various information (e.g. company name, product name, testing results, etc.). See operation 102. Such information correctly describes the article of manufacture when such marking takes place.

Thereafter, any of the aforementioned information may become out-of-date, and thus be no longer accurate. For example, a company may wish to revise a product name associated with the article of manufacture. In such situation, the indicia may be removed in operation 104. To this end, such indicia may be updated in the manner shown in operation 106. Unfortunately, such extra step of removing the indicia can be costly, thus adding additional cost to each article of manufacture.

Further, in a case where the article of manufacture is fragile or sensitive to the aforementioned indicia removal process (e.g. in the case of integrated circuits, etc.), the article of manufacture may even be damaged by the removal operation 104. This in turn, results in an increase in the number of unusable articles which, in turn, again increases the cost of each article of manufacture.

SUMMARY

A system, method and computer program product are provided for marking an article of manufacture. After marking an article of manufacture with a first identifier that describes at least one aspect of the article, such article is further marked with a supplemental identifier that describes the at least one aspect of the article.

BRIEF DESCRIPTION OF THE DRAWINGS

Prior art

DETAILED DESCRIPTION

Figure 1:
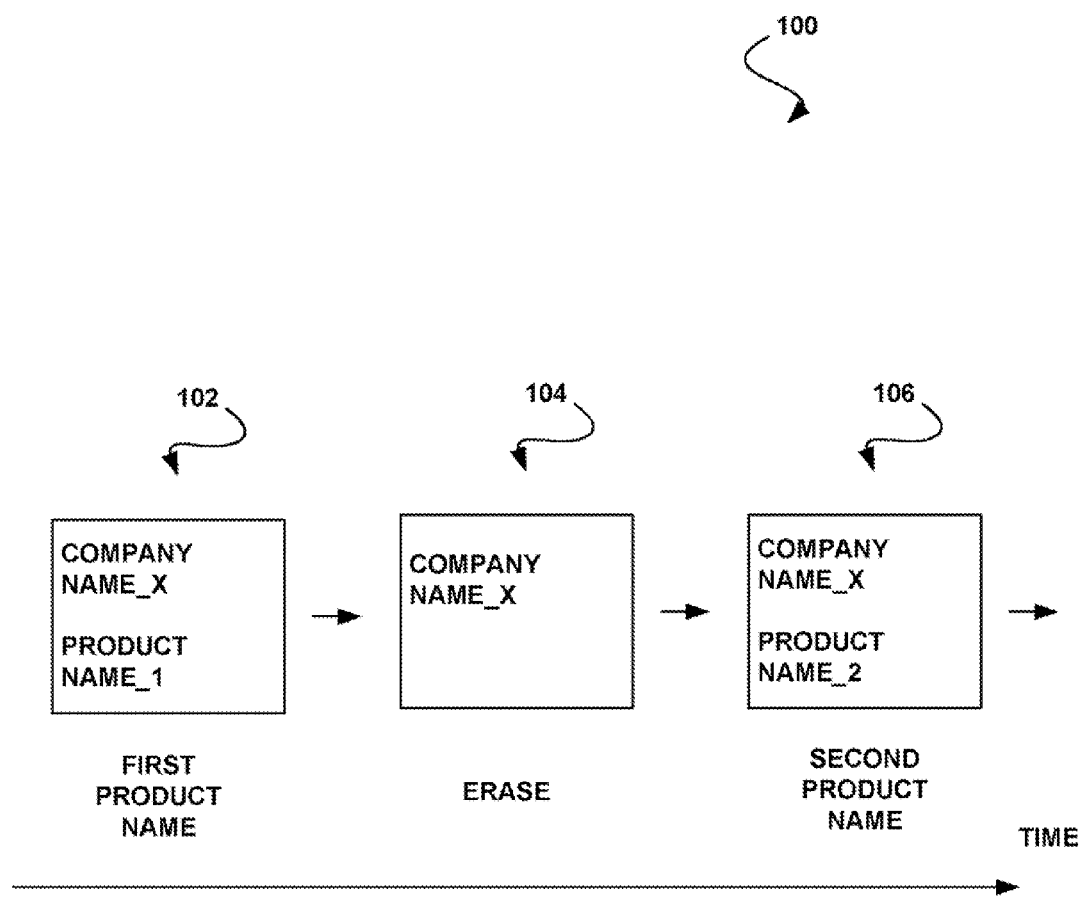
FIG. 1 illustrates a process for marking an article of manufacture, in accordance with the prior art.
Figure 2:
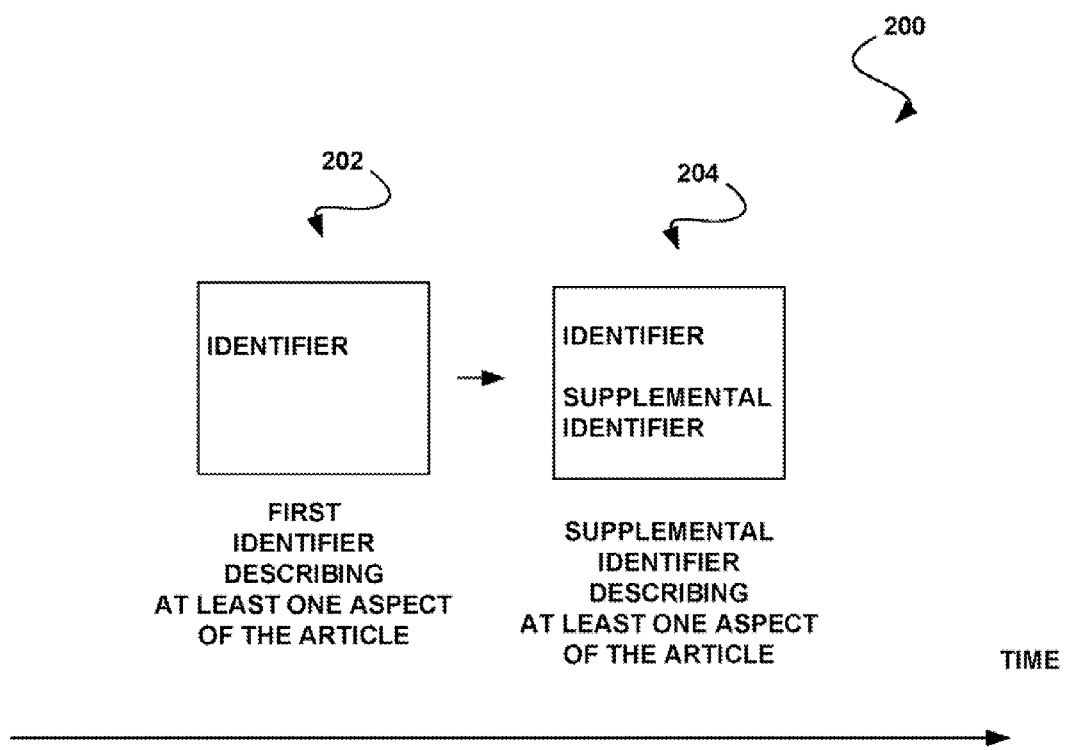
FIG. 2 illustrates a process for marking an article of manufacture with a supplemental identifier, in accordance with one embodiment.

FIG. 2 illustrates a process 200 for marking an article of manufacture with a supplemental identifier, in accordance with one embodiment. As shown, an article of manufacture is marked with a first identifier that describes at least one aspect of the article of manufacture. See operation 202.

In one embodiment, the article of manufacture may include a semiconductor-related article of manufacture. Just by way of example, the semiconductor-related article of manufacture may include an integrated circuit (IC). Further, the IC may include a processor (e.g. graphics processor, etc.). Examples of such processor will be described in further detail with respect to FIG. 8.

In other various embodiments, the article of manufacture may include packaging, products, etc. associated with the IC. For example, the article of manufacture may include an IC package, a circuit board, a tray for holding one or more ICs, and/or an entire system including an IC. It should be noted, however, that such semiconductor-related articles of manufacture are set forth for illustrative purposes only and should not be construed as limiting in any manner. For example, other examples of articles may include, but are not limited to computer readable media (e.g. compact discs, DVDs, hard drives, etc.), other computer components (e.g. displays, I/O devices, etc.). Of course, however, the article of manufacture (hereinafter "article") may include any article capable of being marked with an identifier, for that matter.

It should be noted that the aspect of the article that is described by the first identifier may include absolutely any aspect associated with the article. Just by way of example, such aspect may be a company name, lot number, date, country of origin, product name, and/or absolutely any other aspect, for that matter.

In one specific embodiment, the aspect of the article may include a testing-related aspect of the article. For example, a type of test (e.g. version, date, temperature, load, etc.) performed on the article may be described. Also, results of a test performed on the article may also be described.

In another embodiment, the aspect of the article that is described by the first identifier may include a standard related aspect of the article. Optionally, the standard related aspect may include an industry standard associated with the article. Further, the standard related aspect may include a standard complied with in manufacturing the article.

In yet another embodiment, the aspect of the article may include a physical aspect of the article. Just by way of example, an architecture of the article may be described. In the context of an IC, the physical aspect may include a number of fuses utilized therein. Optionally, the number of such fuses may indicate a type of the IC (e.g. workstation processor, consumer processor, etc.).

In another example, the physical aspect may include a heat sink, a micro-cooler (e.g. for cooling the article), physical dimensions, thermo/electrical aspects and/or any other physical aspect capable of being associated with the article. Moreover, the physical aspect may include a status of the article. Such status may include, for example, an original status, a reworked status, a removed status, etc.

Still yet, the first identifier describing the aspect of the article may include any desired type of identifier, as will be described below with respect to a supplemental identifier. In addition, the first identifier may be marked on the article in any desired manner, as also described below with respect to the supplemental identifier. In this way, the first identifier may be utilized to describe various aspects of an article.

At a later time, the article is marked with a supplemental identifier describing the at least one aspect of the article. See operation 204. Similar to the first identifier, the supplemental identifier may be capable of describing any aspect of the article. Thus, in one embodiment, the supplemental identifier may update the description associated with the first identifier.

The supplemental identifier may include any desired type of identifier. In one embodiment, the supplemental identifier may include indicia. For example, such indicia may include alphanumeric characters (e.g. a sequence of alphanumeric characters, a single alphanumeric character, etc.) In other examples, the indicia may include symbols, a bar code and/or any other indicia capable of describing at least one aspect of the article. Moreover, the indicia may be encoded. In another embodiment, the supplemental identifier may include a radio frequency identifier (RFID).

It should be noted that the identifier may represent information associated with the article aspect(s) in any desired manner. For example, in one embodiment, the identifier may itself include such information. In other embodiments, the identifier may include a pointer, index, key, etc. that may be used to locate the information at a separate location (e.g. in a database, etc.).

In addition, the supplemental identifier may be marked on the article in any desired manner using any desired machine. For example, the supplemental identifier may be stamped on the article, silk screened thereon, laser etched thereon, embossed thereon, ink marked thereon, stenciled thereon, etc. Furthermore, the supplemental identifier may be marked on the article utilizing shading, color, etc. It should be noted that the types of identifiers and manner of marking such identifiers on an article, as described herein, may be equally applicable to the first identifier described above.

In this way, an article may be marked with a first identifier that accurately describes at least one aspect thereof at the time of the marking with the first identifier. In addition, the article may also be marked with a supplemental identifier, if the first identifier is no longer accurate or requires clarification, etc. The supplemental identifier may then be read in combination with the first identifier and may therefore accurately describe the aspect of the article at the time of the marking with the supplemental identifier. As a result, the first identifier may be ignored and/or modified by the supplemental identifier without requiring physical removal of such first identifier.

More illustrative information will now be set forth regarding various optional details of different embodiments in which the foregoing process 200 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3:
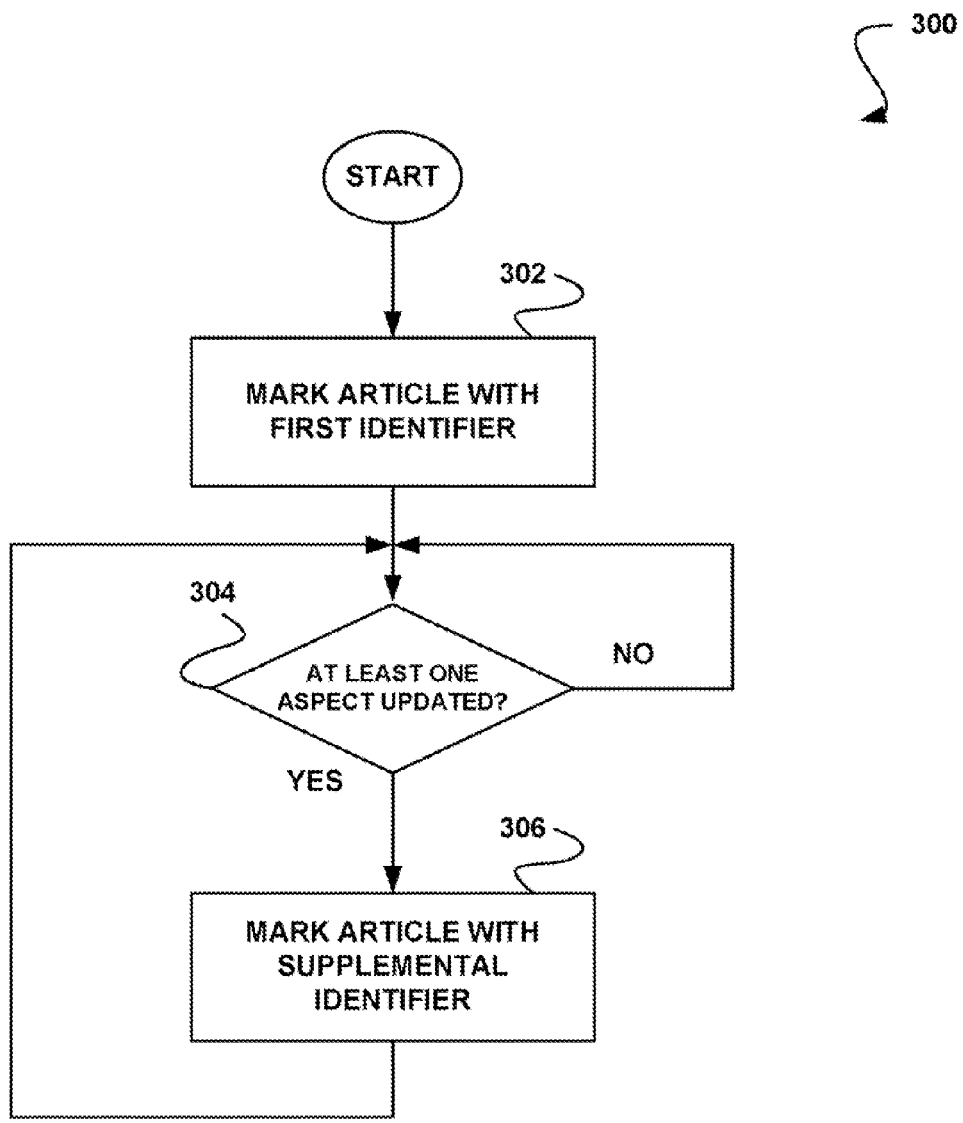
FIG. 3 illustrates a method for marking an article of manufacture with a supplemental identifier, in accordance with another embodiment.

FIG. 3 illustrates a method 300 for marking an article with a supplemental identifier, in accordance with another embodiment. As an option, the method 300 may be used in the context of the process 200 of FIG. 2. Of course, however, the method 300 may be used in any desired environment. In addition, the aforementioned definitions may equally apply to the description below.

As shown in operation 302, an article is marked with a first identifier. The article may include any article capable of being marked. In addition, the first identifier may describe any aspect of the article, as discussed hereinabove.

As an option, the first identifier may accurately describe the aspect of the article at the time of the marking of such first identifier. Just by way of example, the first identifier may describe a company name, lot number, etc. associated with the article at the time of the marking. It should also be noted that the article may be marked with the first identifier in any desired manner.

It is then determined whether the aspect of the article described by the first identifier has been updated, as shown in decision 304. Just by way of example, the aspect may be updated by a changed product name, a new and/or improved test performed on the article, changed physical characteristics, etc. If it is determined that an aspect of the article has not been updated, the method 300 continues to wait for such an update.

If, however, it is determined that the aspect of the article has been updated, the article is marked with a supplemental identifier, as shown in operation 306. The supplemental identifier may accurately describe the update associated with the article. In this way, the article may be marked with a supplemental identifier in conjunction with the first identifier for accurately describing such article. One specific example of such a supplemental identifier will be described in further detail with respect to FIG. 5 et al.

Figure 4:
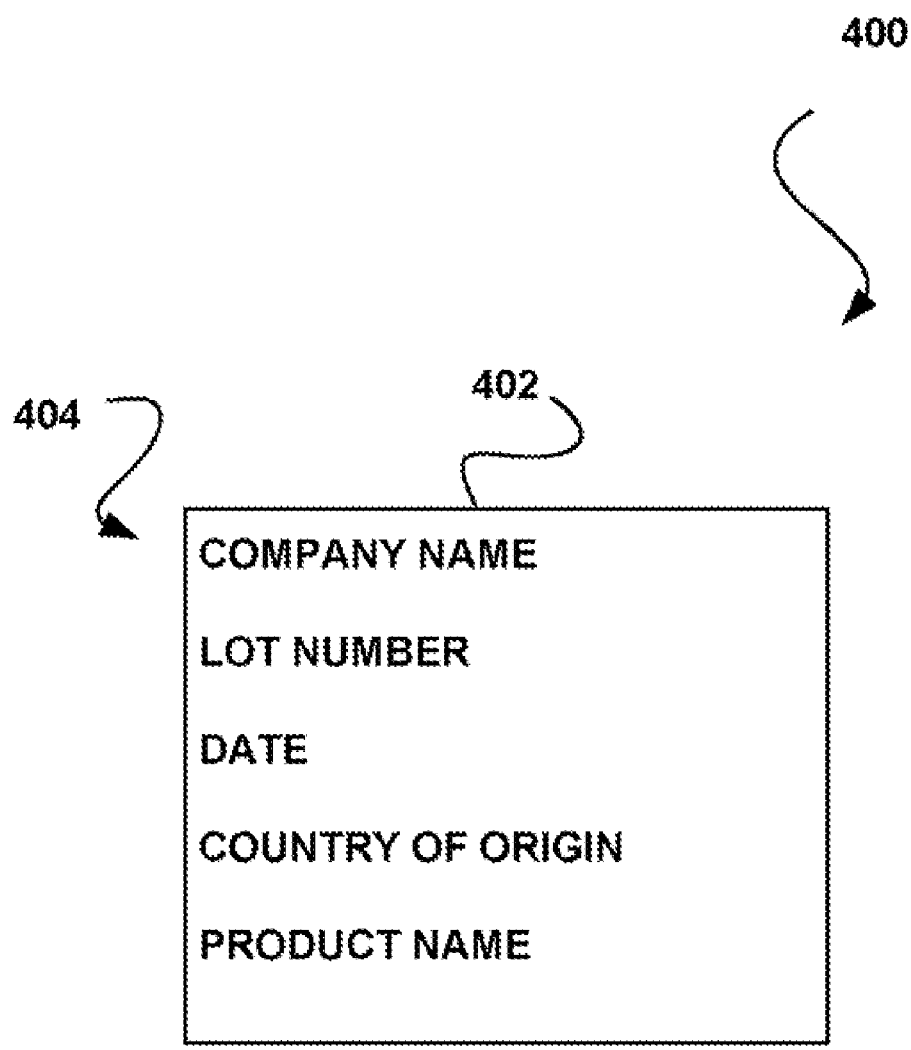
FIG. 4 illustrates a marking associated with an article of manufacture, in accordance with yet another embodiment.

FIG. 4 illustrates a marking 400 associated with an article 402, in accordance with yet another embodiment. As an option, the marking 400 may be used in the context of the details of FIGS. 2 and/or 3. Of course, however, the marking 400 may be used in any desired environment. Again, the aforementioned definitions may equally apply to the description below.

As shown, indicia in the form of identifiers 404 may be placed on the article 402. Specifically, the identifiers 404 may be physically marked on the article 402. The identifiers 404 may include a company name associated with the article 402, as illustrated.

In addition, the identifiers 404 include a lot number associated with the article 402. For example, such lot number may include a unique number, date, time, etc. associated with a lot in which the article 402 was manufactured and/or packaged. Further, the identifiers 404 may include a date. Such date may optionally include a particular day, week, month, etc. in which the article 402 was manufactured and/or packaged.

Moreover, the identifiers 404 may include a country of origin associated with the article 402. The country of origin may optionally include a country where the article 402 was manufactured and/or packaged. As another option, the country of origin may include a country with which the article 402 is compatible. Still yet, the identifiers 404 may include a product name. The product name may further include a code associated with the article 402, a level of quality associated with the article 402 (e.g. whether tested, test results, etc.), a type of the article 402, etc. Of course, however, any other types of identifiers 404 may be utilized for describing any aspect of the article 402.

As an option, the identifiers 402 may be marked on the article 402 during manufacturing and/or packaging of the article 402. As another option, the identifiers 402 may be marked on the article 402 as supplemental markings to original identifiers marked thereon. Thus, the identifiers 404 may update original identifiers that describe the article 402 in order to accurately describe any changes (e.g. product name changes, physical changes, additional tests performed, etc.) made to the article 402 itself. In addition, a history of descriptions of aspects associated with the article 402 may be maintained.

Figure 5:
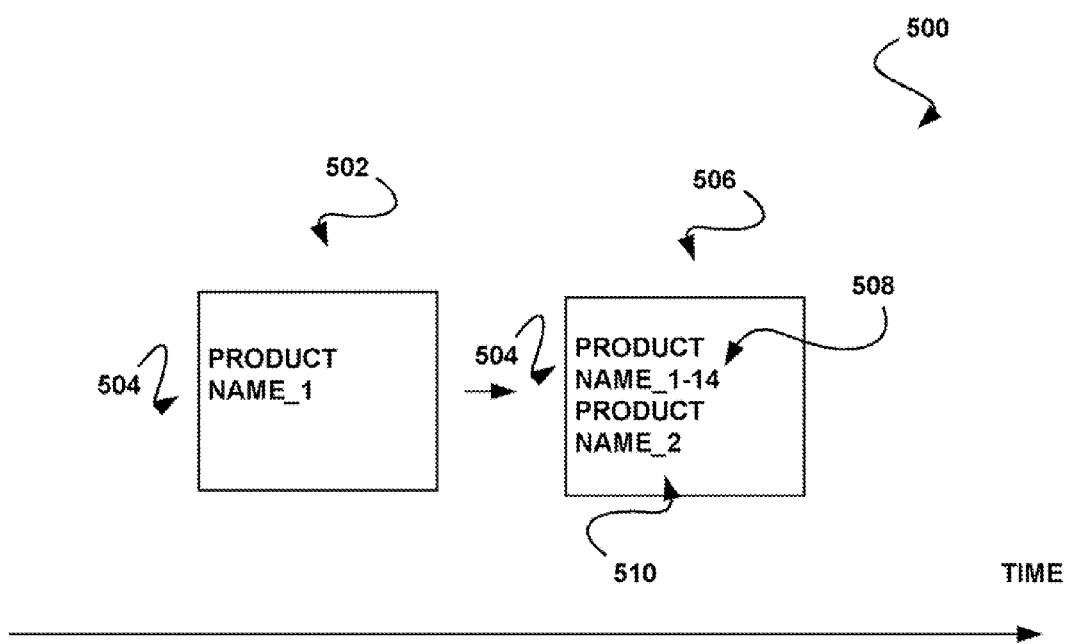
FIG. 5 illustrates a process for marking an article of manufacture with a supplemental alphanumeric identifier, in accordance with still yet another embodiment.

FIG. 5 illustrates a process 500 for marking an article with a supplemental alphanumeric identifier, in accordance with still yet another embodiment. As an option, the process 500 may be used in the context of the details of FIGS. 2-4. Of course, however, the process 500 may be used in any desired environment. Again, the aforementioned definitions may equally apply to the description below.

As shown, an original mark 504 of an original product name (i.e. PRODUCT NAME_1) is initially placed on an article. See operation 502. The original product name 504 may be marked on the article during manufacturing or packaging thereof. Of course, however, the original product name may be marked on the article any time before a supplemental mark 510 is placed thereon. It should be noted that the original product name 504 is shown for illustrative purposes, and that any other identifier may be utilized.

As shown in operation 506, the supplemental mark 510 is subsequently placed on the article. Specifically, the supplemental mark 510 may be placed on the article in association with the original mark 504. As shown, the supplemental mark 510 may include an updated product name (PRODUCT NAME_2). Thus, the supplemental mark 510 may indicate a change in the product name associated with the article.

The supplemental mark 510 may also include a code 508 (e.g. −14) for indicating the method of reading the supplemental mark 510. As specifically shown, the code 508 may include a sequence of alphanumeric characters. Of course, however, the code 508 may include any desired type of code (e.g. symbols, computer language, etc.) capable of signaling a particular command, technique, etc. for reading the supplemental mark 510.

In the context of the present embodiment, the code 508 may include an overwrite code. The overwrite code may indicate that the previous 14 characters are to be overwritten. Thus, the updated product name may be read as being written over the 14 characters immediately previous to the updated product name, and therefore as being written over the original product name (i.e. PRODUCT NAME_1).

In other optional embodiments, an increment code and/or decrement code may be utilized. Such increment and decrement codes may allow an original identifier that is a number (e.g. a speed identifier associated with a processor, etc.) to be incremented or decremented by an identified amount. In addition, an insert code, conclusion code, deletion code and/or any other code may be utilized.

In various embodiments, such codes may be utilized in conjunction with or separate from an additional identifier. For example, if an original identifier is simply inapplicable to an article (e.g. a physical aspect of the article was removed), a code may be utilized to indicate that such original identifier is to be simply ignored. In this way, original identifiers marked on an article may be modified and/or deleted based on an associated code, such that physical removal of the original identifiers may be avoided.

It should be noted that the present description is not limited to the modification and/or deletion of original identifiers. In particular, supplemental identifiers marked on an article may also be modified and/or deleted in a similar manner. For example, supplemental identifiers may also be updated utilizing additional supplemental identifiers.

Table 1 illustrates exemplary codes that may be utilized in conjunction with supplemental identifiers for modifying previous identifiers. It should be noted that such codes and identifiers are illustrated for exemplary purposes only, and should not be construed as limiting in any manner.

TABLE 1

1. (PRODUCT-7 T) = TRODUCT
2. (PRODUCT100-3 2) = PRODUCT 200

Figure 6:
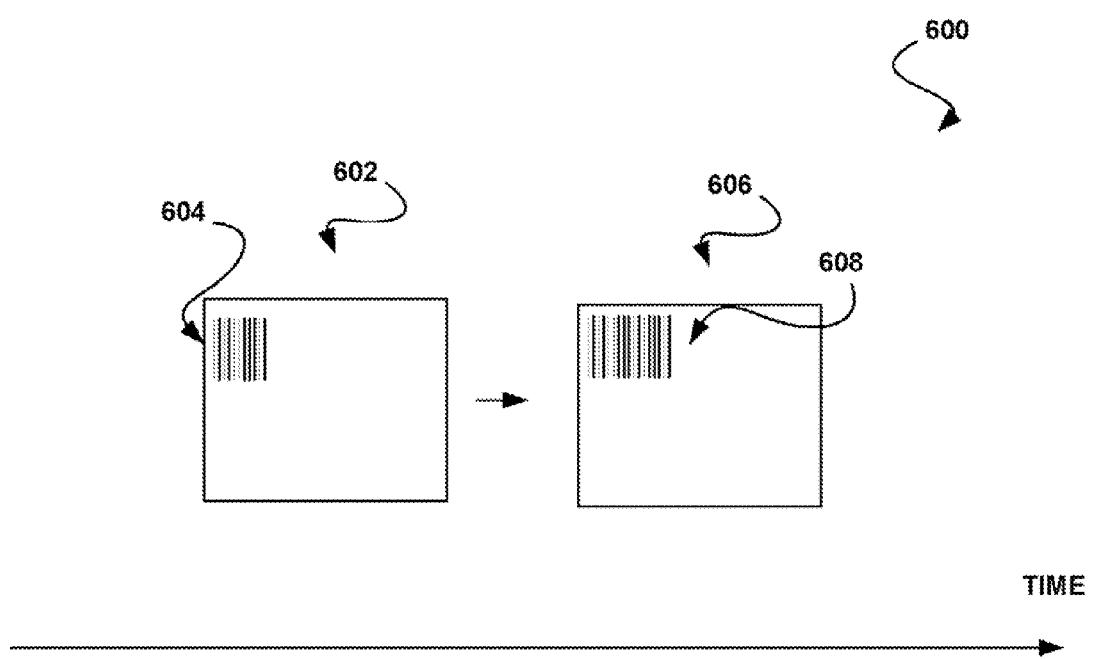
FIG. 6 illustrates a process for marking an article of manufacture with a supplemental bar code identifier, in accordance with another embodiment.

FIG. 6 illustrates a process 600 for marking an article with a supplemental bar code identifier, in accordance with another embodiment. As an option, the process 600 may be used in the context of the details of FIGS. 2-5. Of course, however, the process 600 may be used in any desired environment. Again, the aforementioned definitions may equally apply to the description below.

As shown, an original mark 604 which includes an original bar code is placed on an article. See operation 602. The original bare code may describe at least one aspect of the article. Just by way of example, the original bar code may describe a product name associated with the article.

An updated mark 608 is subsequently placed on the article. See operation 606. The updated mark 608 may include an updated bar code that is placed on the article in conjunction with the original bar code. Thus, the updated bar code may be read in conjunction with the original bar code.

The updated bar code may include an updated description of the aspect of the article described by the original bar code. In addition, the updated bar code may include a command associated with the updated description of the aspect of the article. For example, the updated bar code may include a command to insert the updated description into the original bar code, to overwrite the description associated with the original bar code, etc. Thus, bar codes may be supplemented for updating descriptive information marked on an article.

Figure 7:
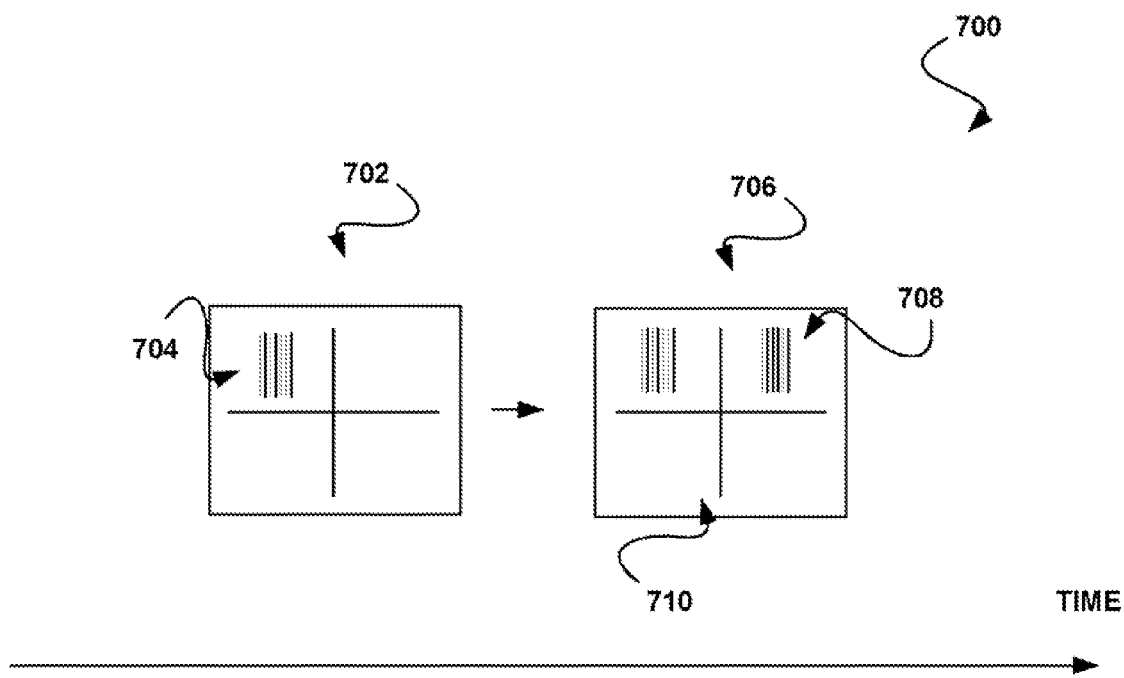
FIG. 7 illustrates a process for marking an article of manufacture with a spatially encoded supplemental bar code identifier, in accordance with yet another embodiment.

FIG. 7 illustrates a process 700 for marking an article with a spatially encoded supplemental bar code identifier, in accordance with yet another embodiment. As an option, the process 700 may be used in the context of the details of FIGS. 2-6. Of course, however, the process 700 may be used in any desired environment. Again, the aforementioned definitions may equally apply to the description below.

As shown, an original mark 704 is place on an article, as indicated in operation 702. The original mark 704 includes an original bar code located in a top left portion of the article. The original bar code may describe at least one aspect of the article.

As also shown, an updated mark 708 is subsequently placed on the article. See operation 706. The updated mark 708 is placed on the article in conjunction with the original mark 704. The updated mark 708 includes an updated bar code which updates the description of the aspect of the article associated with the original bar code.

The updated bar code is placed in a top right portion of the article. Thus, the original mark 704 may be spatially separated with respect to the updated mark 708 for indicating that the updated mark 708 is the most recent update. For example, in the context of the present illustrated embodiment, marks may be read from left to right, and top to bottom. Thus, the updated bar code may be read as the latest update.

In addition, a subsequent bar code may be marked in the bottommost left portion 710 to indicate that it is a most recent update, and so forth. Of course, it should be noted that any type of spatial scheme may be utilized to indicate which marks are the most recent. Just by way of example, a code may be appended to a previous mark for indicating the location of a next updated mark. In this way, spatial separation may be utilized to update descriptions of the article without requiring the removal of any previous descriptions already marked on the article.

Figure 8:
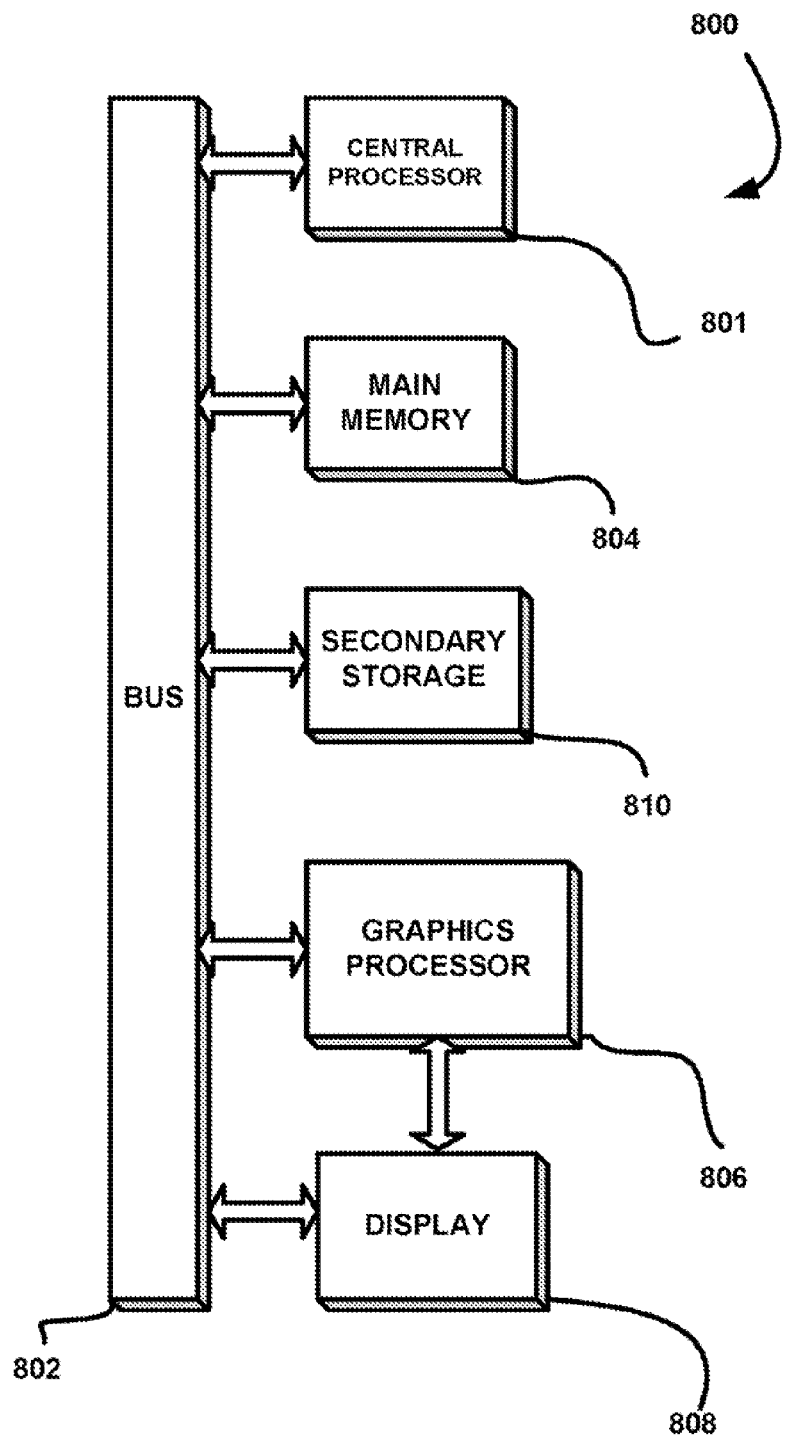
FIG. 8 illustrates an exemplary system in which the various architecture and/or functionality of different embodiments may be implemented, in accordance with one embodiment.

FIG. 8 illustrates an exemplary system 800 in which the various architecture and/or functionality of different embodiments may be implemented, in accordance with one embodiment. For example, any of the following components of the system 800 (or even the system 800 itself) may serve as an example of an article subject to the foregoing marking.

As shown, the system 800 is provided including at least one central processor 801 which is connected to a communication bus 802. The system 800 also includes main memory 804 [e.g. random access memory (RAM), etc.].

The system 800 further includes a graphics processor 806 and a display 808. In one embodiment, the graphics processor 806 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

Still yet, the system 800 may include a secondary storage 810. The secondary storage 810 may include, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 804 and/or the secondary storage 810. Such computer programs, when executed, enable the system 800 to perform various functions. Memory 804, storage 810 and/or any other storage are possible examples of computer-readable media.

In one embodiment, the architecture and/or functionality of the various previous figures may be implemented in the context of the host processor(s) 801, graphics processor 806, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, a mobile system, and/or any other desired system, for that matter. Just by way of example, the system may include a desktop computer, lap-top computer, hand-held computer, mobile phone, personal digital assistant (PDA), peripheral (e.g. printer, etc.), any component of a computer, and/or any type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   after marking an article of manufacture with a first identifier that describes at least one aspect of the article of manufacture, marking the article of manufacture with a supplemental identifier adjacent to the first identifier that describes the at least one aspect of the article of manufacture, utilizing a hardware processor;
   wherein the supplemental identifier, when read in conjunction with the first identifier, accurately describes the at least one aspect of the article of manufacture at a time of the marking with the supplemental identifier;
   wherein the supplemental identifier includes a command to insert an updated description into the first identifier.

2. The method of claim 1, wherein the supplemental identifier includes indicia.

3. The method of claim 2, wherein the indicia includes alphanumeric characters.

4. The method of claim 2, wherein the indicia includes a bar code.

5. The method of claim 2, wherein the indicia is encoded.

6. The method of claim 1, wherein the supplemental identifier includes a radio frequency identifier.

7. The method of claim 1, wherein the first identifier represents information associated with the at least one aspect of the article of manufacture.

8. The method of claim 7, wherein the supplemental identifier represents an update to the information.

9. The method of claim 1, wherein the first identifier accurately describes the at least one aspect of the article of manufacture at a time of the marking with the first identifier, and the supplemental identifier accurately describes the at least one aspect of the article of manufacture at the time of the marking with the supplemental identifier.

10. The method of claim 1, wherein removal of the first identifier is avoided.

11. A computer program product embodied on a computer readable medium, comprising:
   computer code for marking an article of manufacture with a supplemental identifier adjacent to a first identifier, where the supplemental identifier describes at least one aspect of the article of manufacture, after marking the article of manufacture with the first identifier that describes the at least one aspect of the article of manufacture;
   wherein the supplemental identifier, when read in conjunction with the first identifier, accurately describes the at least one aspect of the article of manufacture at a time of the marking with the supplemental identifier;
   wherein the supplemental identifier includes a command to insert an updated description into the first identifier.

12. A system, comprising:
   a machine for marking an article of manufacture with a supplemental identifier adjacent to a first identifier, where the supplemental identifier describes at least one aspect of the article of manufacture, after marking the article of manufacture with the first identifier that describes the at least one aspect of the article of manufacture;
   wherein the supplemental identifier, when read in conjunction with the first identifier, accurately describes the at least one aspect of the article of manufacture at a time of the marking with the supplemental identifier;
   wherein the supplemental identifier includes a command to insert an updated description into the first identifier.

13. The method of claim 1, wherein the first identifier is modified by the supplemental identifier.

14. The method of claim 1, wherein the supplemental identifier includes an updated product name.

15. The method of claim 1, wherein the supplemental identifier includes a code for indicating a method of reading the supplemental identifier.

16. The method of claim 15, wherein the code includes an overwrite code.

17. The method of claim 15, wherein the code includes at least one of an increment code and a decrement code.

18. The method of claim 1, wherein the first identifier is a speed identifier associated with a processor.

19. The method of claim 16, wherein the overwrite code indicates that characters preceding the supplemental identifier are to be overwritten.

20. The method of claim 1, wherein the identifier and the supplemental identifier are indicated by marks placed on a single article.

21. The method of claim 1, wherein the marking of the article of manufacture with the supplemental identifier is at a later time after the marking of the article of manufacture with the first identifier.

22. The method of claim 1, wherein the supplemental identifier is updated utilizing at least one additional supplemental identifier marked on the article of manufacture.

* * * * *